(12) United States Patent
Doerr et al.

(10) Patent No.: US 6,473,745 B2
(45) Date of Patent: *Oct. 29, 2002

(54) INTELLIGENT ADVISOR SYSTEM AND METHOD

(75) Inventors: Eric W. Doerr, Redmond; Robert A. Cape, Issaquah; Christopher K. Brownell, Woodinville, all of WA (US); Stephen N. Cole, Durham, NC (US); Jan T. Miksovsky, Seattle, WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/127,649

(22) Filed: Jul. 31, 1998

(65) Prior Publication Data

US 2002/0002546 A1 Jan. 3, 2002

(51) Int. Cl.[7] .................................................. G06N 5/00
(52) U.S. Cl. .............................. 706/11; 706/45; 706/59
(58) Field of Search ............................ 706/45, 59, 11; 703/2; 705/20

(56) References Cited

U.S. PATENT DOCUMENTS

| | | | | |
|---|---|---|---|---|
| 5,311,422 A | * | 5/1994 | Loftin et al. | 703/2 |
| 5,913,210 A | * | 6/1999 | Call | 705/20 |
| 5,960,419 A | * | 9/1999 | Fagg, III et al. | 706/59 |
| 5,978,784 A | * | 11/1999 | Fagg, III et al. | 706/45 |

* cited by examiner

Primary Examiner—Wilbert L. Starks, Jr.
(74) Attorney, Agent, or Firm—The Law Offices of Albert S. Michalik, PLLC

(57) ABSTRACT

A method and system for providing intelligent advice to a user. An architecture is described wherein trigger points are placed in an application program, and an advice engine invoked by the application when a trigger point is reached. The advice engine obtains information such as a user's application data, and uses the data to test it against a number of conditions for that trigger point. For each condition met, the advice engine retrieves an advice template for providing advice corresponding to the condition, and based on information in the template versus display state information, decides whether to queue the advice for subsequent display to the user. A display process displays the queued advice according to a priority setting maintained in the template.

30 Claims, 6 Drawing Sheets

Real Time Advice Template C: Pay off the highest interest debt first

| | |
|---|---|
| Trigger Point | Transaction entry |
| Trigger | No debt plan in effect, non-future credit card payment is entered for a credit account which is paid normally (not a charge account or marked as paid off each billing period) and has a non-zero interest rate, payment amount is greater than or equal to 10% of the account balance and greater than $50, money is still owed on another credit account that has a higher interest rate. |
| Calculations | None |
| Text | You have just made a <$ Payment Amount> payment to <Account Name>, which has a lower interest rate than <Account name>. Experts suggest to first pay ... payment. Action steps: Go to the Debt Reduction Planner |
| Links | None |
| Max Display # | 3 |
| Remission Time | 180 days |
| Min Display Interval | 15 days |
| Duplication | Add |
| Priority | 1 |

FIG. 4

68$_D$

INTELLIGENT ADVISOR SYSTEM AND METHOD

FIELD OF THE INVENTION

The invention relates generally to computer systems, and more particularly to an improved method and system for providing advice to a user of a computer program.

BACKGROUND OF THE INVENTION

At times, a user of an application program or operating system may benefit from receiving advice. A basic way in which advice may be provided in a graphical user interface environment is to provide a help button on which a user may click. In response, a dialog box, window or the like is displayed via which the user searches for the desired information. A drawback to this type of advice is that the user needs to ask for it, and moreover, the user needs to have some idea of what to look for. If, for example, the user is not aware that he or she is about to do something wrong or has already done something wrong, then no advice will be given, which may cause harm to the user. For example, a user may inadvertently lose data by rebooting without first saving data if the consequences of such an action are not understood. However, a typical user will not request help so as to be advised of the consequences before re-booting.

As a result, a second type of advice is provided based on monitoring for certain situations and then warning the user before taking an action. Typical examples include prompting a user requesting the deletion of a file before performing the deletion, or advising a user when attempting to write to a floppy disk that is not inserted into the disk drive.

Slightly more sophisticated monitors also have been developed. For example, one such monitor in a word processing program detects when a user appears to have misspelled a word, and provides a visual warning (e.g., via a wavy underline) to indicate the possible misspelling. Such a monitor essentially determines when a separate word has been completed, searches a dictionary in response, and makes a yes or no decision based on the search result. Another type of monitor looks for a salutation such as "Dear Mr." so as to offer assistance to a user possibly writing a letter.

While to a crude extent such monitors provide advice, they are not sophisticated, particularly in that they tend to look for a single condition, and when the condition is detected, the monitor basically does the same thing every time. However, many types of real-life advice depend on a much more complex analysis of factors, with variable results depending on current circumstances. For example, the sale of stock may result in taxable income, but only to the extent the net sale price exceeds the basis, and only if to the extent that it is not offset by some deductible loss. Similarly, mortgage rates may have recently dropped, but whether a user should be advised to refinance depends on the user's current rate. While the particular events could be monitored by hard coding them into a financial program, contemporary monitors only inform the user of the event, leaving the user the task of going out and finding the information needed to answer a question posed by the event. If the user does not understand the problem or what to look for, then the user cannot answer the question. For example, if mortgage rates have recently dropped, the user first needs to understand that savings may or may not be achieved through refinancing, depending on variables such as how much lower the new rate being offered is relative to the user's rate, the financing costs, how long the user intends to stay in the mortgaged property, and so on. The user must then find the various pieces of data, along with a formula for determining the time until the monthly payment savings recoup the costs, (if ever).

In sum, contemporary monitoring solutions do not provide intelligent advice, in that they do not render specialized, personalized and context sensitive advice that would be valuable to a computer user performing more complex tasks. Moreover, such monitoring solutions are not extensible, flexible or adaptable to various circumstances. By way of example, financial advice differs from country to country, and it would not make sense to advise a user on buying life insurance to cover estate taxes in a country where there are no estate taxes.

SUMMARY OF THE INVENTION

Briefly, the present invention provides a system and method for providing intelligent advice to a user. To this end, at points in the program at which advice may be beneficial to the user, the application invokes an advice engine. In response, the advice engine obtains state information needed to evaluate test conditions for determining a type of advice to provide. For example, the advice engine may retrieve user application data such as a bank account balance and a current interest rate. The advice engine uses this information in a formula or the like to compare the information against at least one test condition, and for each test condition satisfied, the advice engine selects appropriate advice. The advice information is preferably maintained in a template, which further includes rules on queuing the advice for display. The advice engine evaluates these rules against queued state information to determine whether to queue the advice, and if so, at what priority. Queued advice is then displayed to the user in accordance with its priority.

An architecture is described wherein trigger points are placed in an application program at locations in the application program where advice may be useful, and the advice engine is invoked by the application when a trigger point is reached. The advice engine obtains information from various sources, such as a database that includes the user's application data, and uses the obtained information to test it against a number of conditions for that trigger point. One type of intelligence is thus embodied in the test conditions which typically are based on formulas for analyzing the user's data. For each condition met, the advice engine retrieves an advice template for providing advice corresponding to the condition. Based on rules and limits in the template versus display state information, the advice engine decides whether to queue the advice for subsequent display to the user, and a display process subsequently displays the queued advice according to a priority setting maintained in the template. Another type of intelligence is embodied in the rules for queuing or not queuing a display, and in the way in which advice is displayed in a prioritized manner.

Other advantages will become apparent from the following detailed description when taken in conjunction with the drawings, in which:

BRIEF DESCRIPTION OF THE DRAWINGS

FIG. 4 is a representation of an advice template including information on how and when to provide advice in accordance with various aspects of the present invention.

DETAILED DESCRIPTION OF THE PREFERRED EMBODIMENT

Exemplary Operating Environment

Figure 1:
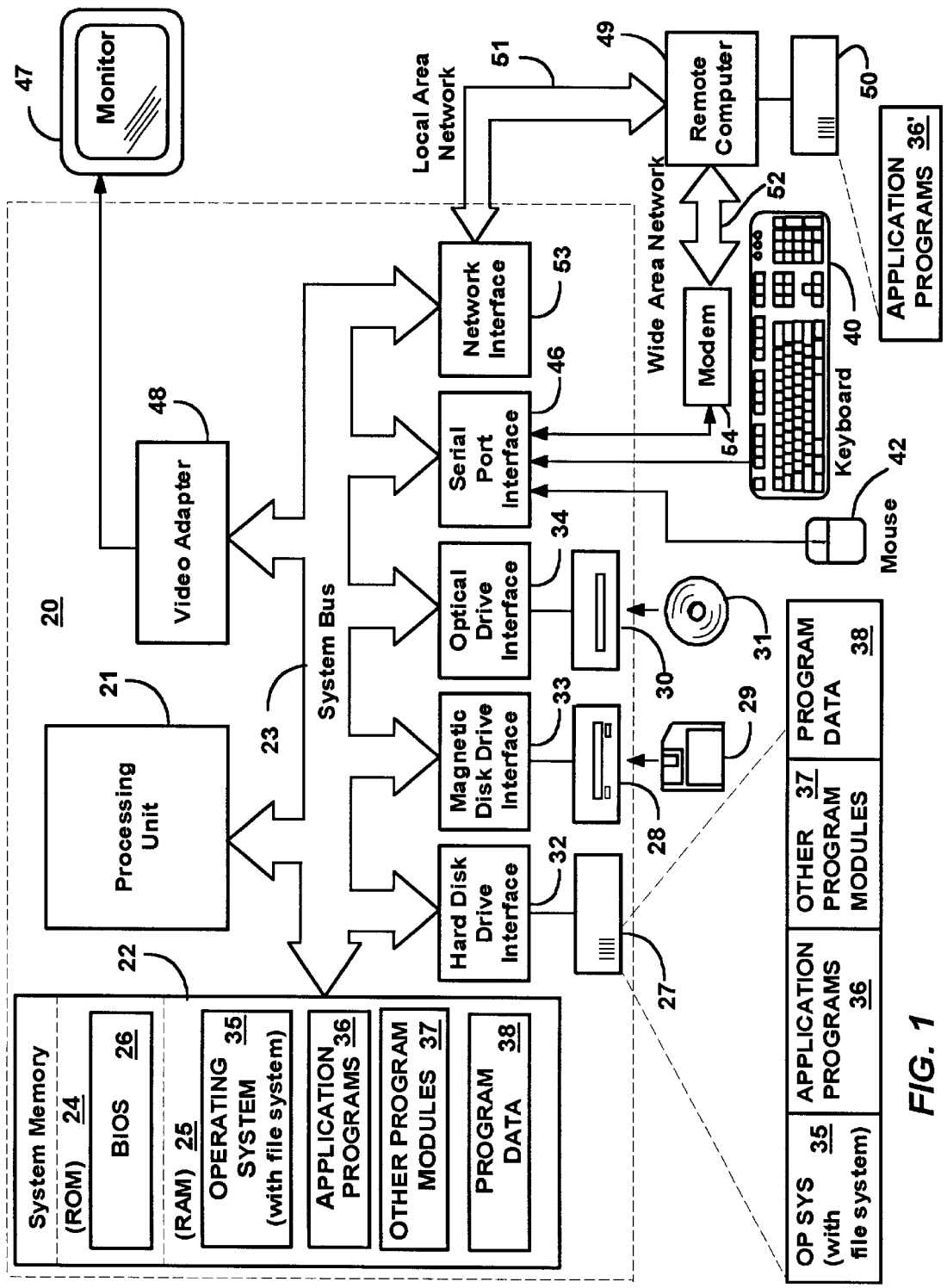
FIG. 1 is a block diagram representing a computer system into which the present invention may be incorporated.

FIG. 1 and the following discussion are intended to provide a brief general description of a suitable computing environment in which the invention may be implemented. Although not required, the invention will be described in the general context of computer-executable instructions, such as program modules, being executed by a personal computer. Generally, program modules include routines, programs, objects, components, data structures and the like that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35 (preferably Windows NT), one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite dish, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, Intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

Intelligent Advisor

In general, the present invention provides a method and system for providing advice to a computer user in a manner that is "intelligent" in that the advice may be specialized, personalized and context sensitive by adjusting to current application and other data states. To this end, the system and method include a highly flexible architecture for analyzing various conditions at relevant times during the execution of an application program and rendering appropriate advice based on the state of the application and user data with respect to those conditions. While the present invention was originally implemented in a financial environment and thus includes examples of providing financial advice, it should be understood that the present invention is not limited to rendering financial advice in a financial application program, but instead has numerous applications throughout user computing. Such applications include use of the advisor architecture in an operating system as well as in application programs. Moreover, although the various components are shown and described herein as separate components because of certain benefits resulting from separated functionality, it can be readily appreciated that some or all of the components may be combined into more complex components, and/or separated even further into additional components.

Figure 2:
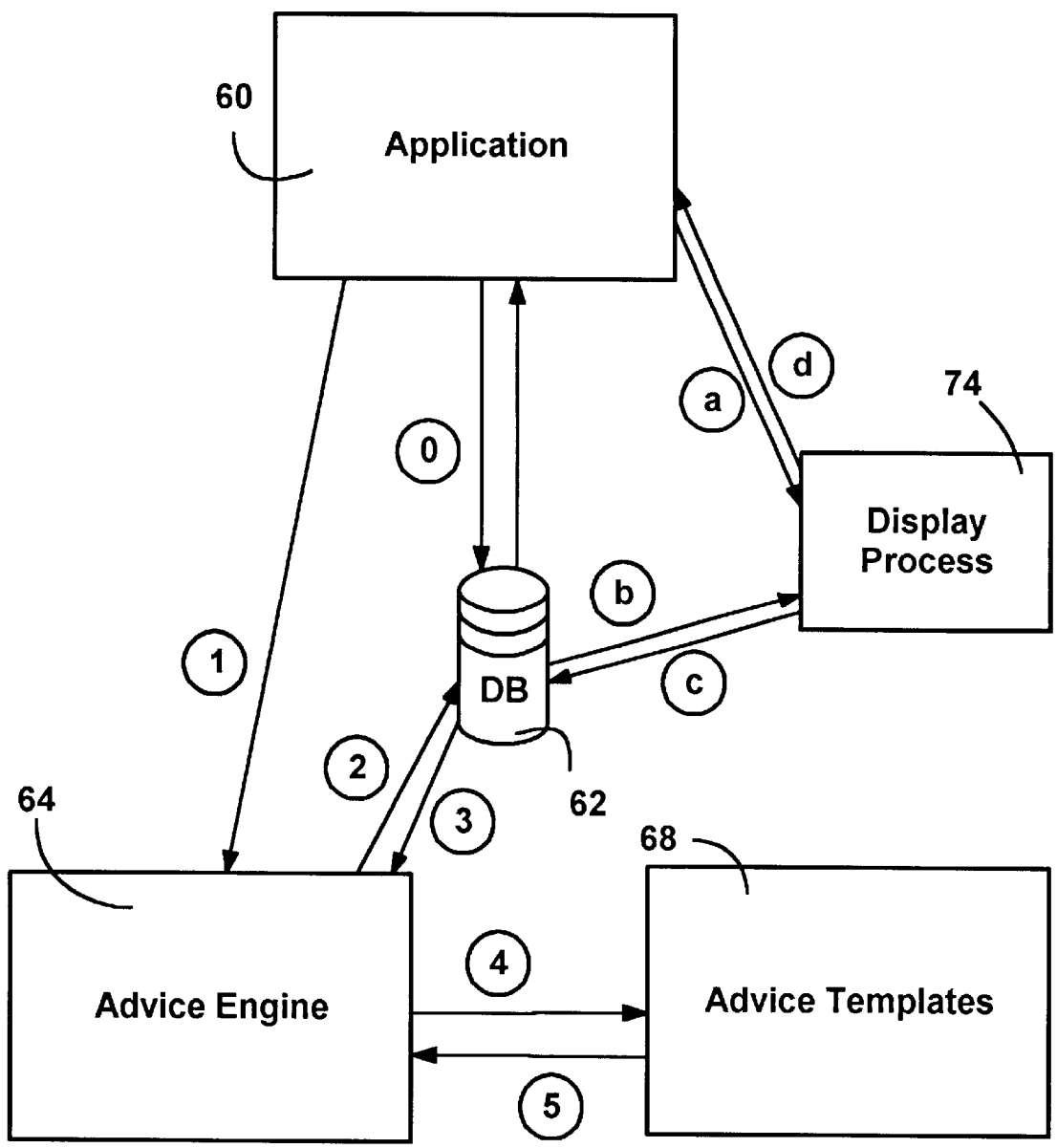
FIG. 2 is a block diagram representing a general architecture into which the present invention may be incorporated, including components for providing advice to a user of an application.
Figure 3:
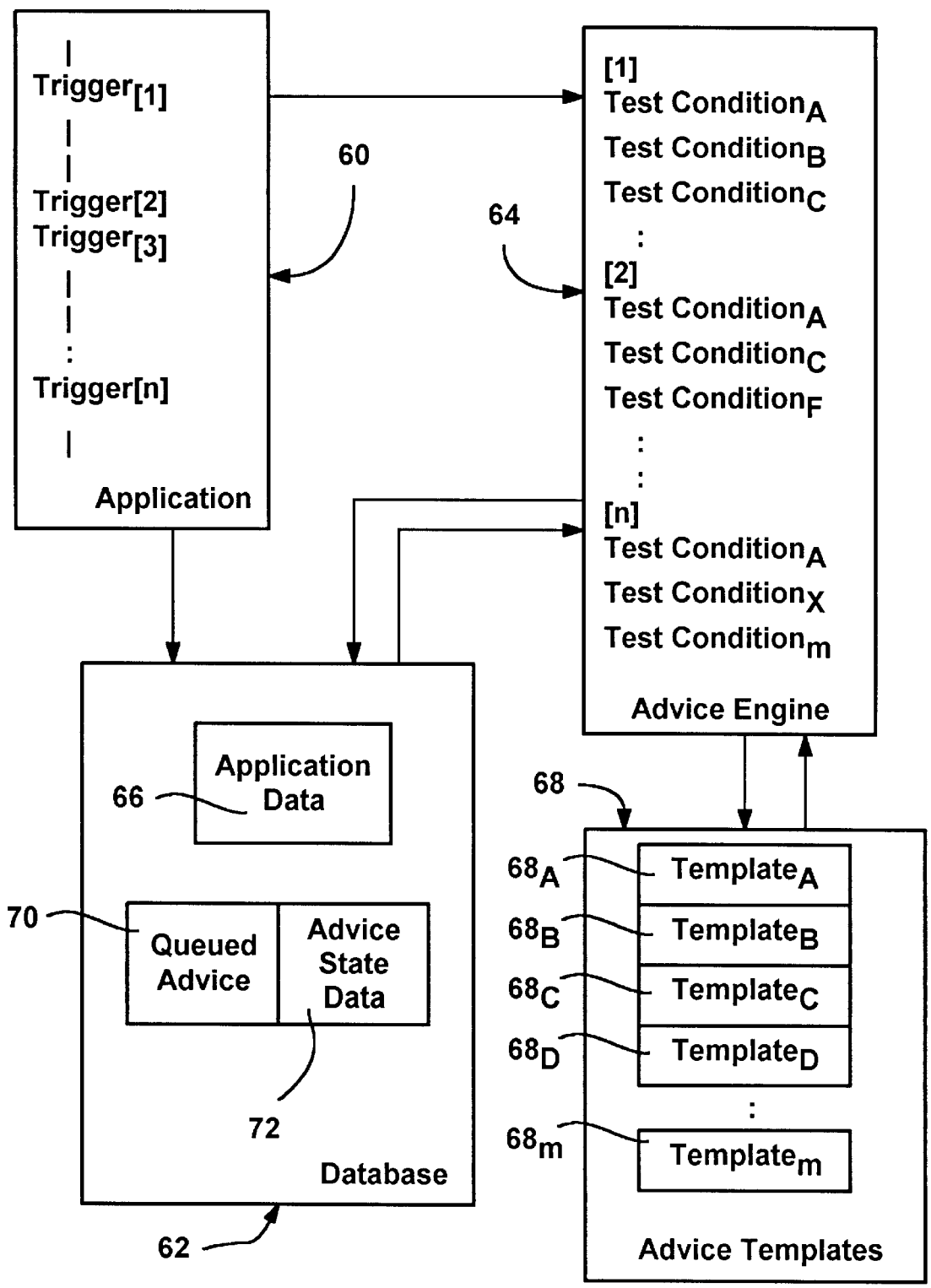
FIG. 3 is a block diagram representing the various components and sub-components therein for providing advice in accordance with one aspect of the present invention.

FIGS. 2 and 3 generally illustrate a preferred architecture for rendering advice in which an application program 60 reads and writes its data to a database 62 or some other storage mechanism. In FIG. 2, the circled numerals and letters show one possible ordering of how advice is rendered. For purposes of illustration, FIG. 2 starts with numeral zero, wherein data is written to the database or storage mechanism 60, such as when a user enters a transaction, e.g., recording the withdrawal of funds from a checking account.

In accordance with one aspect of the present invention, as shown in FIG. 3 and as described in more detail below, at certain locations in the application program 60, trigger points (Trigger$_{[1]}$–Trigger$_{[n]}$) have been placed wherein advice is deemed likely to be needed. By way of example, in a financial application program,, trigger points might be placed at points wherein the user enters a transaction, requests generation of a report, opens or closes a file, adds, closes, sets up or removes an account, requests balancing, or downloads current information such as current interest rates. In another example, a user of a spreadsheet might benefit from analysis-type advice when displaying a graph, and thus a trigger point may be placed near a call to the graphing function. Another trigger point may be appropriately placed with a condition based a particular date or time of day, for example, at startup, an operating system may advise a user to backup the system if more than a week has passed since the last backup. Note that while trigger points are advantageous, particularly in that they leave the application in control of when to (possibly) provide advice, it is understood that the present invention may provide advice without trigger points, such as by having a separate background program watch for significant events.

In general, when a trigger point is reached, the application 60 typically passes some state information to an advice engine 64. Such information generally includes a string or the like having data therein about the state of the program or data and recent user actions. For example, the application may use this information to inform the advice engine 64 of which particular trigger point was reached, as the advice engine 64 may have a different set of tests for each trigger point. Virtually any type of data may be bundled and sent to the advice engine 64, however it should be noted that trigger points are intentionally simple in nature, and, for example, do not make any judgement on whether to render advice. This separates any complex rules from the main application 60, which, although not necessary to the present invention, provides numerous benefits. For example, one benefit includes not having to add complex analysis code to an existing, relatively debugged application. Another primary benefit is that the rules and conditions for rendering advice may be localized, such as per country, whereby the main application program 60 does not have to be adapted for each situation, e.g., from one country to another. For example, the sale of securities may have tax consequences in one country, but not in another wherein capital gains are not taxed. Accordingly, it would be desirable to render tax advice upon the entry of the transaction in the former instance, but not the latter. To facilitate localization, the advice engine 64 is preferably implemented as a dynamic link library (DLL) that may be localized as desired.

In accordance with one aspect of the present invention and as also shown in FIG. 3, the advice engine 64 includes a number of test conditions (Test Condition$_A$–Test Condition$_m$) for each trigger point. The advice engine 64 is a body of code, separated into a DLL, that takes the information passed from the trigger points in the client application 60 and uses that and other information to compare the current state against the engine's stored test conditions in order to determines what advice, if any, should be "triggered." By way of example, if a user has just entered a transaction (e.g., triggering Trigger$_{[2]}$) indicating that new debt has been acquired, one of the conditions (e.g., Test Condition$_c$) may test the user's debt-to-income ratio against a certain level to determine if advice should be rendered. In this instance, the test condition may be implemented via a formula, e.g., trigger the advice when total monthly debt divided by total monthly income is greater than some appropriate percentage. As can be appreciated, more complex formulas and Boolean expressions may be used, e.g., trigger advice when formulas X and Y but not Z are true. Moreover, one test condition may be a combination of other test conditions. Note that advice may be localized by altering the test conditions in the advisor engine 64, i.e., localization can determine whether advice is triggered. Thus, advice in the form of a warning may be triggered to European users at a twenty percent or greater debt-to-income ratio, while users in the United States, having a different advisor DLL, will:not be warned until their debt-to-income ratio is at thirty percent. Localization is accomplished by simply modifying the appropriate threshold percentage value in the formula. As can be readily appreciated, some of the intelligence of the system and method is built into the test conditions that exist in the advice engine 64.

To determine whether a condition is satisfied, the advice engine 64 may access the database 62 to find other state information such as the current application data 66. This typical action is generally represented by circled numerals 2 and 3 in FIG. 2. As a result, the application 60 does not have to pass all the state information to the advice engine 64, (and indeed may not pass any). It is also feasible to prompt the user at this time, such as if a piece of information needed for testing a condition was not otherwise available. In any event, with such gathered data and the information string passed thereto by the application 60, the advice engine 64 obtains the various state data parameters for testing the conditions. However, it should be noted that the application 60 and/or advice engine 64 may calculate and store some items in advance, particularly during idle times, so that the user does not notice a decline in perceived performance when a trigger point is reached. For example, rather than have the advice engine access the database 62 each time to sum the various sources of income to use in the debt-to-income ratio calculation, the sources of income may be pre-totaled and/or buffered in a higher-speed storage by the application 60 or the advice engine 64. Similarly, the total debt, and even the user's actual ratio itself may be pre-computed for rapid access by the advice engine 64.

In accordance with another aspect of the present invention, when a test condition for triggering advice is true, the advice engine 64 constructs a piece of advice according to one or more one corresponding templates 68 (e.g., Template$_A$–Template$_j$). To this end, as represented by circled numerals 4 and 5 in FIG. 2, the advice engine 64 effectively retrieves an appropriate template identified in conjunction with the test condition, (e.g., if condition true, trigger template C). Note that conditions may directly correspond to one template, or may correspond to combinations of templates, e.g., if the debt ratio is between twenty-five and thirty percent retrieve template B, and if greater than thirty percent retrieve template C.

Templates comprise static data that control the characteristics of each piece of advice, such as how it appears to the user, when it may be displayed to the user and so on. It should be noted that not all triggered advice is displayed to a user, and that of the advice that is selected for display, it is first queued into an advice queue 70 (FIG. 3) in the database 62. Moreover, once queued, different advice may be displayed differently, e.g., some is displayed in real time (i.e., normally immediately), while some is deferred until a later time. A more detailed description of displaying the advice is set forth below.

FIG. 4 shows a sample template $68_D$ for one piece of advice that is triggered under a condition wherein a user has made an unnecessarily excessive payment on a lower interest credit card debt instead of paying down debt on a higher interest credit card. As shown in FIG. 4, the template $64_D$ includes a title which is shown to the user ("Pay off the highest interest debt first") followed by a description of the point in the application 60 that triggered the test condition that in turn invoked this template $68_D$. In the present example, the test condition is caused to be tested each time the user enters a transaction. A trigger field comprises a worded description of the formula that triggers this advice, and a calculations field provides any calculations that the template needs to perform (shown as "none"). Note that these various fields are primarily for descriptive purposes, and that each such field may include multiple entries.

The next field includes the text message that will be displayed to the user, with appropriate variables filled in with their current values at the time that the message is queued. Note that only part of an actual text message is shown in FIG. 4. An additional feature of the present invention is that a template may include links to other sources of information so that the user may obtain more detailed information about a particular topic. For example, a detailed message explaining what a debt-to-income ratio is, how it is calculated and why too large of one is bad is probably not appropriate for including in a warning message, as it consumes resources and may be intimidating to users. However, for some users, such as those users who question the general rule, a link (e.g., an HTML link or simply "Click here to learn more") to a web-site or CD-ROM file, for example, may be provided that will have such information therein.

Another part of the perceived intelligence of the advisor system and method is built into the other fields of the template, which determine if and when a user will see the advice. These template fields set limits, rules and times as to if, how and when the advice is displayed, by comparing them to variable queue state information in a corresponding advice state data 72 (FIG. 3) maintained in the database 62. Note that for each queued piece of advice, the advice state data 72 may be combined with its associated queued advice 70 into a single string or record, such as by appending the advice state data to the queued advice. In any event, a first field in the template holds a maximum display number, which limits the number of times an instance of advice can be shown before it is no longer eligible for display (number of lives). The purpose of this number is to avoid annoying the user by showing the same advice too many times, e.g., if the user chooses to ignore an overdrawn account warning X number of times in a row, there is no point in persisting the warning. However, the following "remission time" field holds a time wherein formerly ineligible advice may be resurrected, i.e., a minimum time that needs to elapse before an instance of advice is "eligible" for display again. More particularly, when a piece of advice is queued, a record is made of the date queued, and display counter for that piece of advice is advanced by one. Note that the date queued recordation and display counter are maintained in the advice state data 72 in the database 66 (FIG. 3). When the value of the display counter is equal to the Maximum Display Number, the advice is no longer shown. However, each time the remission time from the last display of a piece of advice passes, the display counter for the advice is decreased by one (to zero). For example, if a piece of advice has a Maximum Display number of three and a remission time of one month, it could be shown three times, and if not triggered for one month, it would again be eligible to be shown one time. If not shown for two months, it would be eligible to be shown two times, and after three months it would be eligible to be shown three times. Note that the display counter for advice is reset on the first start after the remission time has elapsed. Further, note that since the counter does not go below zero, a piece of advice is never eligible to be shown more times than its maximum display number.

A Display Frequency field is also provided, which sets a minimum time between actual queuing of instances of this advice. For example, if a trigger is fired twice in a minute and has a display frequency of one day, only the first instance will be queued for display. Again, the general purpose of this field is to not frustrate or annoy the user by showing the same advice over and over, which provides for intelligence via setting shorter display frequencies for more important advice. Next, a Duplication Rules field, having a value of either Replace or Add, determines whether an additional instance of the same piece of advice replaces the old instance in the queue 70, or is written to the queue 70 in addition to the old. A final field provides a display priority that determines whether the advice will be shown in real time, (i.e., as soon as possible in a prominent dialog box), as "FYI" advice, (i.e., as soon as possible but more subtly displayed) or deferred (i.e., at startup or when the user specifically requests display). Deferred advice is stamped with the time it is triggered so that a user reviewing the advice recognizes that any data accompanying the advice may be stale. As can be readily appreciated, the priority field handles the concept that some advice is time-sensitive, (e.g., show the advice on paying off higher debt first before the user sends the check), while other advice can wait, (e.g., consider refinancing . . .). Other priorities are feasible, such as a very high priority that results in a flashing warning message.

Although not necessary to the present invention, like the advice engine 64, the templates 68 are collected and implemented as a separate component. This provides a benefit in that the templates may be updated, supplemented and/or otherwise modified without having to change the application 60 or the advice engine 64. The templates 68 are preferably written in HTML text so that third party developers thereof may easily customize the advice to a specific situation. Indeed, it is feasible that the users may also modify advice specifically tailored to their particular situation. For example, a network administrator is able to customize advice for users of that network, a teacher may customize advice for students, and so on.

To display the queued advice, a display process 74 (FIG. 2) is provided that generally runs in the background and examines the queued advice 70. For real time (priority one) advice, the display process 74 retrieves the advice as soon as it can and displays it in its own window (dialog box), or provides the advice to the application 60 for display thereof. As shown in FIG. 2 by circled letters A–D, the application 60 may also control the display process 74 to show all of the queued advice, typically at startup and when the user requests a monthly report for a financial application. The display process 74 may sort the data by priority and/or queued time, ordinarily first sorting advice by priority and secondly by oldest advice first. To keep advice from overflowing the advice queue 70, advice may be removed after a certain age, e.g., advice is dequeued after three months. Queue size limitations may also be implemented, for example, allocate only two megabytes for the queue 70 and appropriately remove advice to maintain the size.

Figure 5:
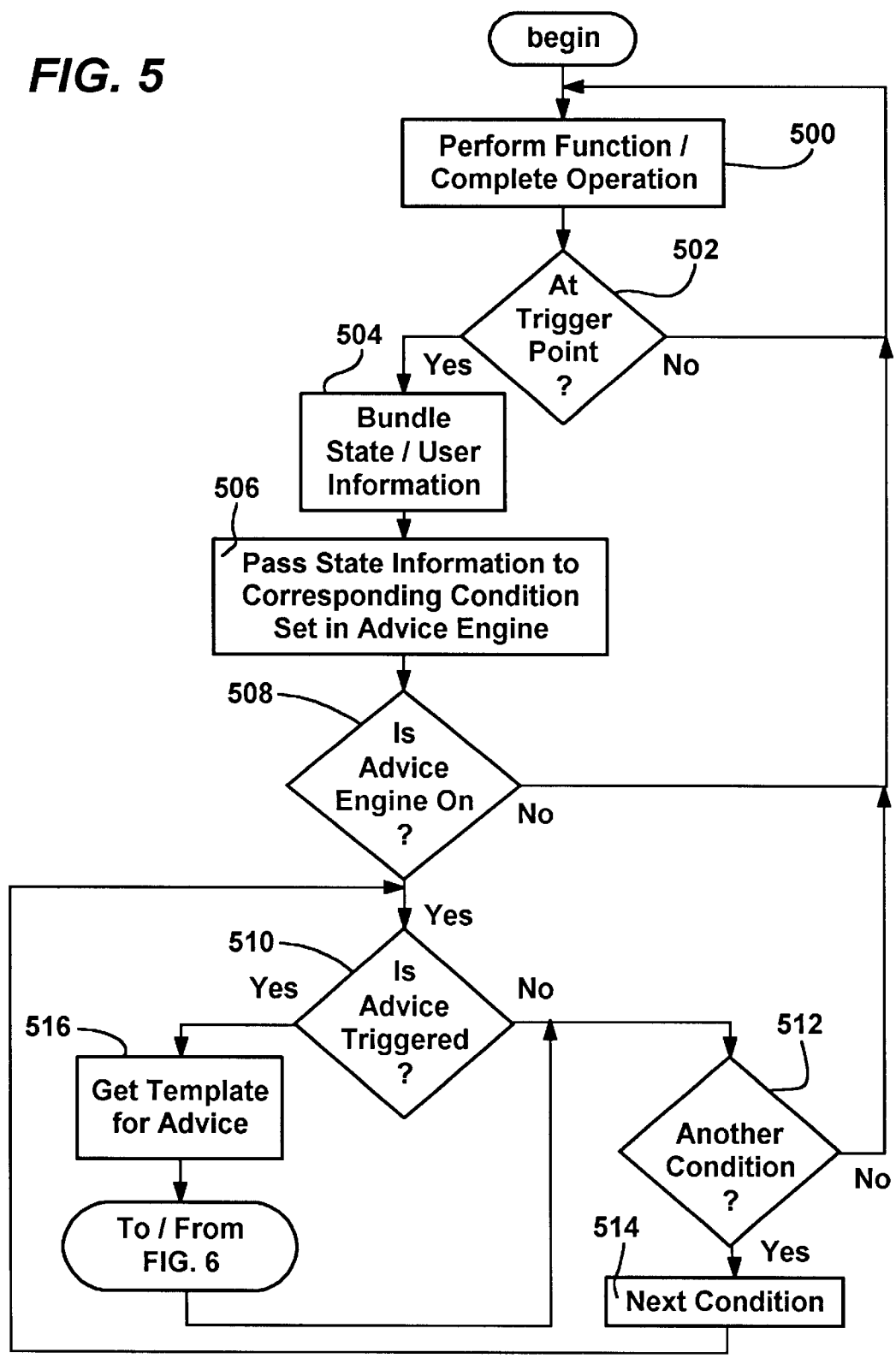
FIGS. 5–6 comprise a flow diagram generally representing the steps taken to provide advice to a user of an application in accordance with one aspect of the present invention.
Figure 6:
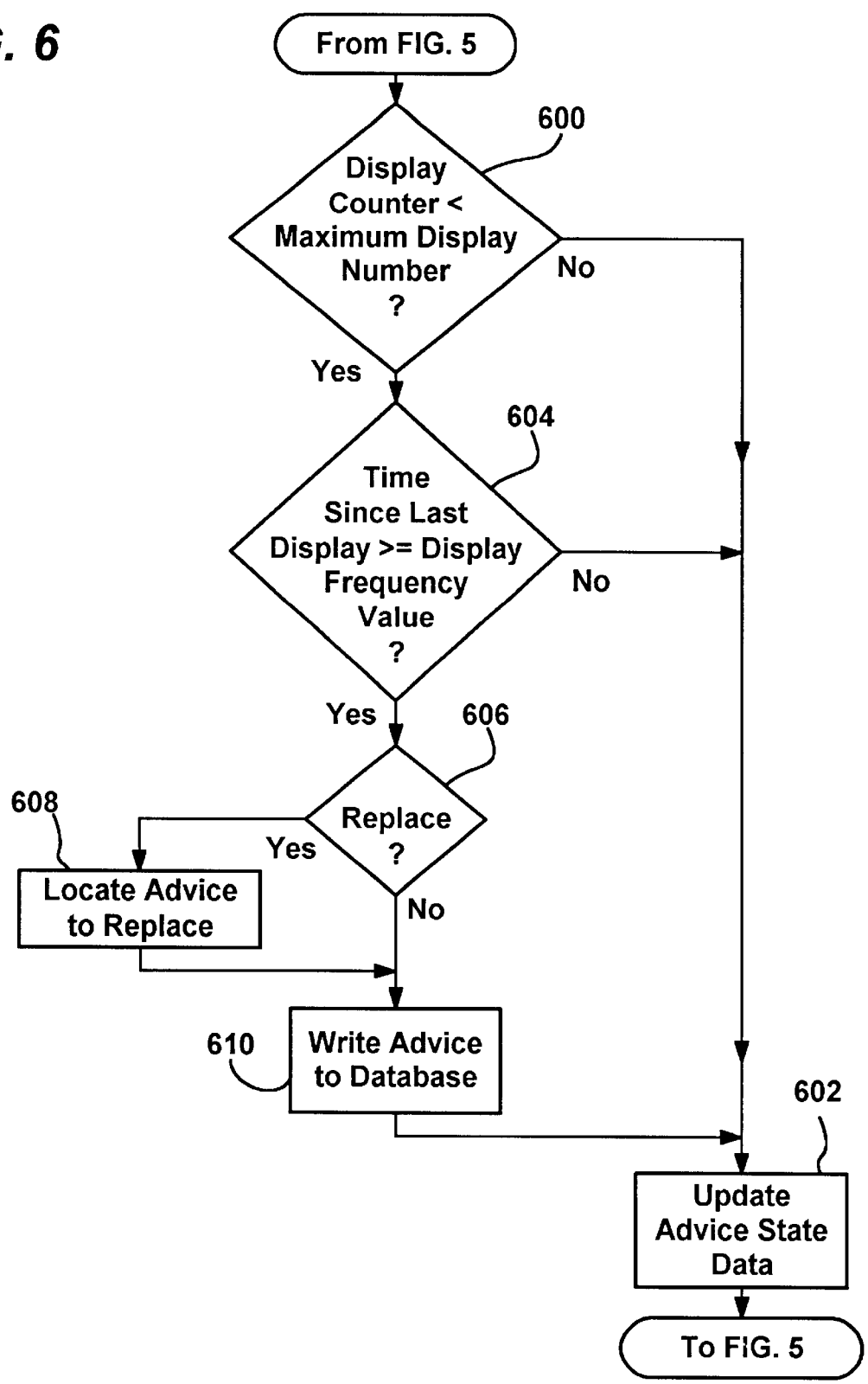

Turning now to an explanation of the operation of the invention with particular reference to the flow diagrams of FIG. 5 and 6, the logic of the advice process begins following the completion of some operation by an application 60 at step 500. As represented by steps 500–502, the application 60 continues to perform functions until a trigger point is reached. Once reached, step 502 branches to step 504 wherein the application bundles any state information that it wishes to send to the advice engine 64, (e.g., the identity of the trigger point), and then passes that information at step 506. At step 508, the advice engine 64 is tested to determine whether it is disabled. At certain times, the advice engine may be deactivated by the application program 60, typically because at those times, many trigger points would be reached where advice is not likely to be useful. For example, application operations such as account deletion, file conversion, archiving, reconciling transactions, presenting the Product Tour and while the user navigates the sample file will hit many trigger points in the application 60, however providing advice at these times is undesirable. Accordingly, the application 60 is capable of disabling the advice engine 64. When disabled, the advice engine 64 effectively ignores the triggering thereof and returns to the application 60 at step 500. Note that the user may also disable the advisor by turning off advice in a "Tools, Options" dialog of the application program, which will stop advice from being shown. Indeed, advice may be turned on and off by category, for example, show investment advice, but do not show debt advice or home advice.

However, if enabled, at step 510 the advice engine 64 begins to walk through its test conditions, testing any appropriate data against the formulas, limits and so on of those conditions. As described above, the advice engine 64 may access the application data 66 (FIG. 3) in the database 62 as needed to perform the tests. If a test condition is not satisfied, step 512 is performed to see if there is another condition in the set of conditions for this trigger, and if so, step 512 branches to step 514 to get the next condition and return to step 510 for testing thereof. If there are no more conditions to test, step 512 returns to step 500 where the application continues to perform its functions until the next trigger point is reached. However, if at step 510 a condition is satisfied and a piece of advice is triggered, step 510 branches to step 516 which retrieves the corresponding template for that advice. Step 516 then continues on to step 600 of FIG. 6 to determine if the advice should be queued.

At step 600, the current value of the display counter (maintained in the advice state data 72, FIG. 3) is compared against the value of the maximum display number in the retrieved template. If the maximum number has been reached, the advice will not be queued and thus step 600 will branch to step 602 wherein any advice data 70 will be updated. For example, at this time, the difference from the last queued time and the current time may be checked against the remission time so as to possibly decrement the display counter.

If the maximum display number has not been reached, step 600 instead branches to step 604 to determine whether it is too soon to again queue this advice. As described above, the time last queued is recorded in the advice state information 72, and at step 604, this time is subtracted from the current time and the result compared against the display frequency value stored in the template. If the time elapsed since last queued is not greater that the display frequency value, then the advice may not be queued for display, whereby step 604 branches to step 602 to update the advice state data and return without having queued the advice. However, if not too soon to display again, step 604 branches to step 606 to queue the display.

Before queuing the display, step 606 is performed to determine if the advice should replace existing advice or independently queue the advice. For example, if advice has been queued to point out that an account balance is below a minimum, and the same advice is later queued with a more current account balance, the old advice may be overwritten, since the user will not benefit from seeing the stale data. However, other types of advice, such as "Pay off the highest interest debt first," are better if added, since, for example, different sets of debt payments may have triggered the same advice.

Thus, if advice is to be replaced, step 606 branches to step 608 to locate that advice in the queue 70. Otherwise, the advice will be written at the end of the queue 70. Step 610 represents the writing of the advice to the appropriate location in the queue 70. Once written, step 610 continues on to step 602 wherein any updates are made to the advice state data. In particular, the display counter will be incremented at this time and the queuing time recorded. The process then returns to step 512 to test for other conditions, until no conditions remain to be tested.

In this manner, specialized personalized and context sensitive advice may be queued for display according to complex rules. As described above, the display process 74 then outputs a display from the queued advice based on a priority scheme, further highlighting the intelligence of the system and method as perceived by the user.

As can be seen from the foregoing detailed description, there is provided a method and system that provide intelligent advice to a user. The method and system are flexible, extensible and provide an architecture that facilitates the localizing of advice.

While the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A system for providing advice to a user of a computer program, comprising:

an advice queue;

an advice engine separate from the computer program and configured to communicate with the computer program;

a trigger point inserted into the computer program at a point when a user running the computer program may benefit from advice, the trigger point configured to invoke the advice engine when reached;

when invoked, the advice engine further configured to:
1) access at least one test condition based on information associated with the trigger point;
2) access program state data;
3) evaluate the program state data against the at least one test condition to produce a result; and
4) determine whether advice is warranted based on the result, and if so, to locate an advice template corresponding to the state data and the at least one test condition, evaluate queuing data associated with the advice template, and output information transformed from the program state data to the advice queue if the queuing data indicates that the information is appropriate for queuing; and a display process that accesses at least one display setting and outputs the information in the advice queue into visible advice displayed to a user based on the at least one display setting.

2. The system of claim 1 wherein the program state information includes user application data.

3. The system of claim 1 wherein the program state information includes data passed from the application to the advice engine.

4. The system of claim 1 wherein the program state information is stored in a database.

5. The system of claim 1 wherein the test condition includes a formula.

6. The system of claim 1 wherein the advice engine and the template are separable components.

7. The system of claim 1 wherein the queuing data in the template includes a limit on the number of times the advice may be queued.

8. The system of claim 7 wherein the queuing data in the template includes information indicative of a time when advice that is limited from being queued may again be queued.

9. The system of claim 1 wherein the queuing data in the template includes a limit on how often the advice may be queued.

10. The system of claim 1 wherein the queuing data in the template includes information indicating that at least some existing advice in the queue is to be replaced with the advice.

11. The system of claim 1 wherein the template includes only static information.

12. The system of claim 1 wherein the at least one display setting includes information indicative of a display priority, and wherein the display process displays the advice relative to other advice according to the display priority.

13. The system of claim 1 wherein the data in the template includes a link to other data maintained at a source external to the computer program and the advice engine.

14. A method of providing advice to a user of a computer program, comprising:
inserting a trigger point in the computer program at a point at which advice may be beneficial to the user;
receiving input, the input causing the trigger point to be reached in the program;
invoking an advice engine in response to achieving the trigger point;
obtaining program state information at the advice engine;
comparing the program state information against at least one test condition;
selecting advice data as selected advice data for possible output for each test condition satisfied;
accessing queuing data for the selected advice data;
transforming at least some of the program state information and selected advice data into queued advice data based on the queuing data; and outputting the queued advice based on at least one display setting associated with the queued advice.

15. The method of claim 14 wherein invoking an advice engine includes passing information from the program to the advice engine.

16. The method of claim 14 wherein obtaining state information at the advice engine includes accessing a storage to retrieve user data therefrom.

17. The method of claim 16 wherein comparing the information against at least one test condition includes evaluating the user data to compute the result of a formula.

18. The method of claim 14 wherein the display setting comprises a display priority associated with the queued advice.

19. The method of claim 18 wherein outputting the queued advice further comprises, displaying the queued advice according to the priority.

20. The method of claim 14 further comprising, storing a date with each piece of queued advice.

21. The method of claim 20 further comprising, displaying the queued advice according to the date.

22. The method of claim 14 further comprising, storing a date with the queued advice, and dequeuing the advice based on the date stored therewith.

23. The method of claim 14 wherein queuing the advice further comprises, locating a corresponding piece of advice, and replacing the corresponding piece of advice with a new piece of advice.

24. The method of claim 14 wherein the advice is in a template that corresponds to the condition.

25. The method of claim 14 wherein the queuing data includes a limit value limiting the number of times the advice may be queued, and further comprising, comparing the queuing data against queue state information, and queuing the advice if the queue state information indicates that the advice has not been queued a maximum number of times with respect to the limit value.

26. The method of claim 14 wherein the queuing data includes remission information indicative of a time when advice that is limited from being queued may again be queued, and further comprising, comparing the remission information with a current time, and adjusting queuing state information if the comparing indicates that advice may again be queued.

27. The method of claim 14 wherein the queuing data includes a frequency value limiting how often the advice may be queued, and further comprising, comparing the frequency value against queue state information, and queuing the advice if the queue state information indicates that the advice has not been queued too recently.

28. The method of claim 14, wherein selecting advice for possible output comprises retrieving queue information regarding the test condition and deciding whether to queue advice in a storage based on an evaluation of queue state information against the queue information.

29. A computer-readable medium having computer-executable instructions for performing the method of claim 14.

30. A method of providing advice to a user of a financial computer program, comprising:
maintaining a trigger point in the financial computer program at which financial advice may be beneficial to the user;
receiving financial data, the financial data causing the trigger point to be reached in the financial computer program;

invoking an advice engine in response to achieving the point;

obtaining user application program data at the advice engine;

comparing the user application program data against at least one test condition;

for each test condition satisfied, retrieving queue information regarding the test condition and deciding whether to queue financial advice in a storage based on an evaluation of queue state information against the queue information;

transforming at least some application program data into queued financial advice; and processing the queued financial advice in accordance with queue processing rules to provide a tangible representation of the advice to the user.

* * * * *

UNITED STATES PATENT AND TRADEMARK OFFICE
CERTIFICATE OF CORRECTION

PATENT NO. : 6,473,745 B2
DATED : October 29, 2002
INVENTOR(S) : Doerr et al.

It is certified that error appears in the above-identified patent and that said Letters Patent is hereby corrected as shown below:

Column 2,
Line 48, "providing. advice" should read -- providing advice --.

Column 5,
Line 22, "program,," should read -- program, --.
Line 31, "a condition based a particular date" should read -- a condition based on a particular date --.

Column 6,
Line 9, "in order to determines what advice" should read -- in order to determine what advice --.
Line 27, "will:not" should read -- will not --.

Column 8,
Line 4, "and display counter" should read -- and the display counter --.

Column 10,
Line 10, "is not greater that the display frequency value" should read -- is not greater than the display frequency value --.

Signed and Sealed this

Twenty-sixth Day of October, 2004

JON W. DUDAS
*Director of the United States Patent and Trademark Office*